(12) United States Patent
Ryai, Sr.

(10) Patent No.: US 9,415,451 B2
(45) Date of Patent: Aug. 16, 2016

(54) KEY CUTTING MACHINE

(71) Applicant: HY-KO PRODUCTS COMPANY, Northfield, OH (US)

(72) Inventor: Richard W. Ryai, Sr., North Royalton, OH (US)

(73) Assignee: HY-KO Products Company, Northfield, OH (US)

( * ) Notice: Subject to any disclaimer, the term of this patent is extended or adjusted under 35 U.S.C. 154(b) by 531 days.

(21) Appl. No.: 13/705,568

(22) Filed: Dec. 5, 2012

(65) Prior Publication Data

US 2013/0094918 A1 Apr. 18, 2013

Related U.S. Application Data

(63) Continuation of application No. 12/156,920, filed on Jun. 5, 2008, now Pat. No. 8,342,783, which is a continuation of application No. 11/709,668, filed on Feb. 22, 2007, now Pat. No. 7,387,476.

(60) Provisional application No. 60/775,476, filed on Feb. 22, 2006.

(51) Int. Cl.
*B23C 3/35* (2006.01)

(52) U.S. Cl.
CPC ......... *B23C 3/35* (2013.01); *Y10T 409/300952* (2015.01)

(58) Field of Classification Search
CPC ........... Y10T 409/300952; Y10T 409/301008; Y10T 409/301064; B23C 3/35
See application file for complete search history.

(56) References Cited

U.S. PATENT DOCUMENTS

| | | | |
|---|---|---|---|
| 1,243,810 A | 10/1917 | Christoph | |
| 1,978,628 A | 10/1934 | Hansen | |
| 2,158,761 A | 5/1939 | Olson | |
| 2,645,978 A | 7/1953 | Sejarto et al. | |
| 2,835,289 A * | 5/1958 | Rockwell | 144/48.3 |
| 2,929,177 A | 3/1960 | Sheps | |
| 3,196,750 A * | 7/1965 | Moessner et al. | 409/83 |
| 3,388,619 A | 6/1968 | Schreiber et al. | |
| 3,625,111 A | 12/1971 | Carlo et al. | |
| 3,682,041 A | 8/1972 | Essig | |
| 3,773,360 A | 11/1973 | Timbers | |
| 3,880,047 A | 4/1975 | Dosier | |
| 4,023,464 A | 5/1977 | Zion | |
| 4,354,780 A | 10/1982 | Bougiouris | |
| 4,541,760 A | 9/1985 | Zoueki | |
| 4,553,452 A * | 11/1985 | Keller | B21D 53/42 |
| | | | 70/411 |
| 4,697,300 A | 10/1987 | Warlop | |
| 5,128,531 A * | 7/1992 | Fadel | 250/202 |

(Continued)

FOREIGN PATENT DOCUMENTS

DE 2013030 B * 9/1971 ............ B21D 53/42
DE 2152562 A1 * 5/1972

(Continued)

*Primary Examiner* — Daniel Howell
(74) *Attorney, Agent, or Firm* — McDonald Hopkins LLC

(57) ABSTRACT

A key cutting machine is provided for cutting a key blank from a master key. The key cutting machine comprises a first cutting member that rotates about a substantially horizontal axis for cutting a key pattern on a key blank and a second cutting member that rotates about a substantially vertical axis for cutting a key pattern on a key blank. Additional improvements or features of a key cutting machine are also described.

20 Claims, 9 Drawing Sheets

(56) References Cited

U.S. PATENT DOCUMENTS

| | | |
|---|---|---|
| 5,167,171 A | 12/1992 | Heredia |
| 5,171,112 A | 12/1992 | Roland |
| 5,259,708 A | 11/1993 | Brice |
| 5,271,698 A | 12/1993 | Heredia et al. |
| 5,538,374 A | 7/1996 | Cole et al. |
| 5,660,509 A | 8/1997 | Cole et al. |
| 5,984,597 A | 11/1999 | Chen |
| 6,064,747 A | 5/2000 | Wills et al. |
| 6,179,531 B1 | 1/2001 | Jaw |
| 6,406,227 B1 | 6/2002 | Titus et al. |
| 6,602,030 B1 | 8/2003 | Markbreit |
| 7,172,498 B2 | 2/2007 | Bernard et al. |
| 7,387,476 B2 | 6/2008 | Ryai, Sr. |
| 8,342,783 B2 | 1/2013 | Ryai, Sr. |
| 2002/0168241 A1 | 11/2002 | David et al. |
| 2004/0095380 A1 | 5/2004 | Bass et al. |
| 2005/0000052 A1 | 1/2005 | Byles |

FOREIGN PATENT DOCUMENTS

| | | |
|---|---|---|
| DE | 31 47 248 | 3/1983 |
| DE | 295 02 687.1 | 6/1995 |
| DE | 295 06 683.0 | 7/1995 |
| EP | 133091 A1 * | 2/1985 |
| EP | 1 698 429 | 9/2006 |
| FR | 1534808 A * | 6/1968 |
| GB | 1 363 826 | 8/1974 |
| GB | 1 562 881 | 3/1980 |
| GB | 2 276 106 | 9/1994 |
| JP | 04019007 | 1/1992 |
| WO | 02101180 | 12/2002 |
| WO | 2005042196 | 5/2005 |
| WO | 2007100630 | 9/2007 |

* cited by examiner

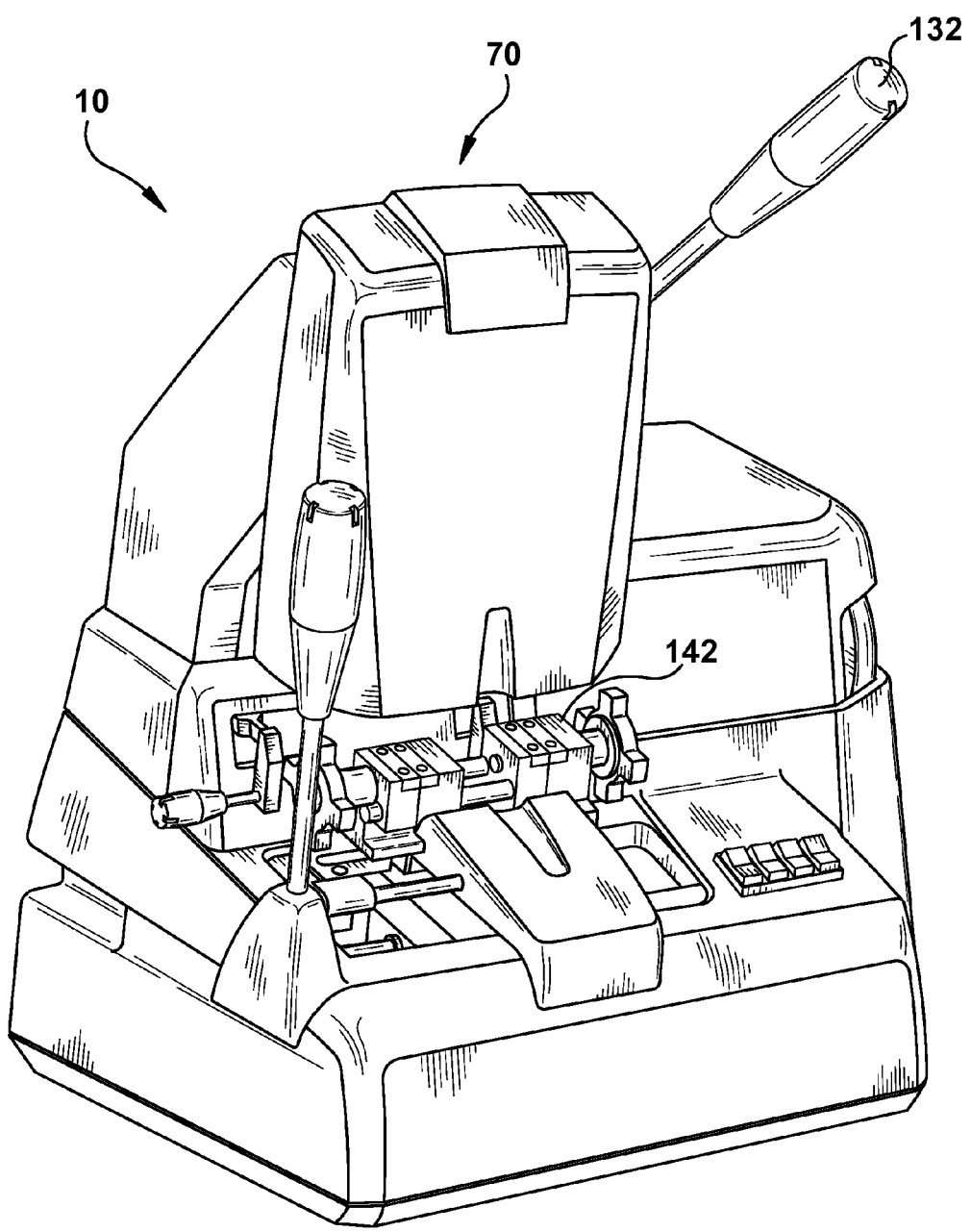
Fig. 9
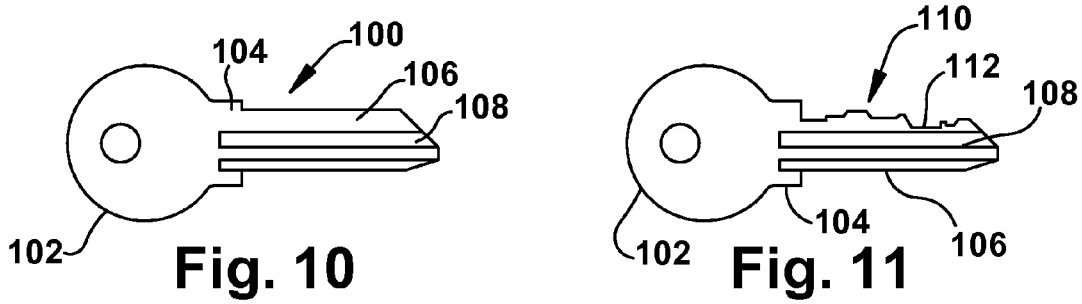
Fig. 10   Fig. 11

KEY CUTTING MACHINE

CROSS-REFERENCE TO RELATED APPLICATION

This application is a continuation of U.S. application Ser. No. 12/156,920, filed Jun. 5, 2008, which is a continuation of U.S. application Ser. No. 11/709,668, filed Feb. 22, 2007, which claims the benefit of U.S. Provisional Patent Application Ser. No. 60/775,476, filed on Feb. 22, 2006, which are hereby incorporated in their entirety by reference.

FIELD OF THE INVENTION

The present invention generally relates to a key cutting machine, and particularly, to a key cutting machine that is capable of cutting a standard key and a sidewinder key.

BACKGROUND OF THE INVENTION

There are several types of key cutting machines used in the industry. Generally, these key cutting machines cut only one type of key known in the field. For example, conventional key cutters use a cutting member, such as, a circular rotating saw-like blade to cut a key pattern in the blade of a standard key blank. These cutting machines generally include a pair of vise grips or clamps mounted on a carriage. A master key having a key pattern previously cut therein is placed in one clamp and a key blank is placed in the adjacent vise clamp. The key pattern of the master key faces a stylus or tracer bar on the key cutting machine and the key blank faces a cutting wheel. The carriage is pivotally and linearly movable along a longitudinal supporting shaft and presses the key pattern of the master key against the tracer bar. Simultaneously, the carriage presses the key blank against the cutting wheel. The carriage is then shifted longitudinally along the supporting shaft thereby causing the key pattern on the master key to travel on the tracer bar and impart corresponding pivotal movement to the carriage so that the cutting wheel cuts the identical key pattern into the corresponding key blank. The key blank cut with the master key pattern is then removed from the vise or grip and buffed on a buffing wheel to remove any burrs.

These types of key cutting machines are the most prevalent cutting machines in the industry. However, these devices are only capable of cutting standard keys. As a result, these devices cannot cut other types of keys known in the field. For example, high security side milled keys, or sidewinder keys, are often used in the automotive sector. Sidewinder keys typically include a shaped head portion and a flat shaft portion extending from the head portion. The flat shaft portion is often referred to as the "blade". The blade has two opposite major surfaces that are each cut by milling so as to cause the surfaces to correspond to a specific bit notch pattern, or ciphering. A drill bit-like cutting member is required to cut such keys. The master key can include holes, dimples, or a sidewinder cut that can be duplicated. The key is traced and the drill bit-like cutting member moves to shape the key.

To accurately duplicate the various keys known in the art, facilities must purchase multiple key cutting machines. By having only one type of key cutting machine, facilities cannot accurately reproduce other types of keys. Therefore, there is a need in the field to provide a key cutting machine that is capable of cutting more than one type of key in a single machine. The dual functionality would increase versatility while eliminating the need for multiple key cutting machines.

Another deficiency of key cutting and duplicating machines is that the cutting tool is typically driven through an intermediate belt and pulley assembly by the output shaft of a driving motor. This increases not only the number of the parts, but also the transmission friction loss.

Yet another deficiency of key cutting and duplicating machines is that a spring biased carriage system is utilized that can cause the clamp members and carriage to prematurely disengage during the final cutting portion of the key tip. Therefore, the cutting wheel tends to slide off of the end of the key blank and therefore not complete the key pattern.

Presently, there is no known key cutting machine or method that avoids the problems associated with the known devices listed above. The present invention as described and claimed herein, addresses the deficiencies of prior art key cutting machines. Nothing in this description should limit the scope of the invention beyond the scope claimed.

SUMMARY OF THE INVENTION

The present invention pertains to a key cutting machine for cutting a key blank from a master key. In one embodiment, a key cutting machine may comprise a first cutting member rotatable about a substantially horizontal axis and a second cutting member rotatable about a substantially vertical axis.

In an embodiment, a key cutting machine has a moveable carriage and an interchangeable clamp structure. In yet another embodiment, a key cutting machine has a first cutting member that rotates about a substantially horizontal axis for cutting a first key pattern on a first key blank, and a second cutting member rotatable about a substantially vertical axis, that is pivotable from a key cutting position to a storage position.

DESCRIPTION OF THE DRAWINGS

Operation of the invention may be better understood by reference to the following detailed description taken in connection with the following illustrations, wherein:

FIG. 9 is a front view of the key cutting machine of FIG. 1 with the sidewinder key cutting apparatus and housing connected thereto.

FIG. 10 is a side view of a key blank.

FIG. 11 is a side view of a master key.

DETAILED DESCRIPTION

Figure 1:
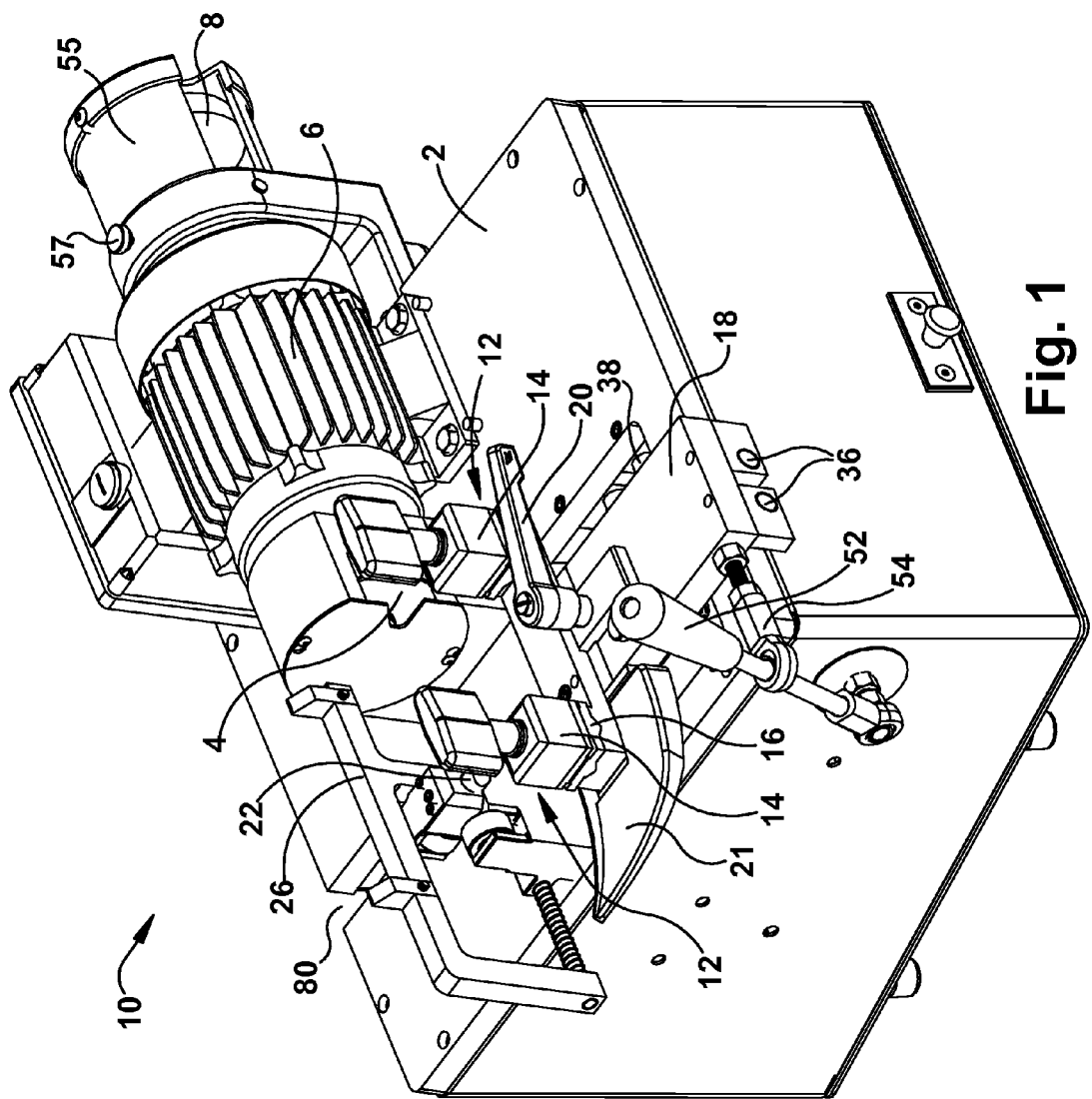
FIG. 1 is perspective view of a first embodiment of an interchangeable key cutting machine.

While the present invention is described with reference to embodiments described herein, it should be clear that the present invention is not limited to such embodiments. Therefore, the description of the embodiments herein is merely illustrative of the present invention and will not limit the scope of the invention as claimed.

With reference to FIGS. 10 and 11, a brief introduction to key blanks and master keys is as follows. A key blank 100 generally comprises a head 102, a shoulder 104, and a blade 106. Key blanks can also be provided with keyway grooves 108 which are long, narrow, milled-out areas along the sides of the blade 106 that allow the blade 106 to bypass the wards in the keyway. Such keyway grooves 108 may previously be cut into a key blank so as to simplify the key cutting operation. Therefore, when duplicating a master key, a key blank 100 must be identified as either identical to or similar to the master key. The key blank 100 is cut from a master key 110. The master key 110 generally comprises a head 102, a shoulder 104, a blade 106, and a keyway groove 108. However, the master key 110 has a key pattern 112 already cut into the blade 106. The particular key pattern 112 corresponds to the pin and tumbler design of a lock. In another embodiment, the key blank 100 may be a key blank for a sidewinder key, and the master key 110 may have a sidewinder key pattern 112 already cut into the blade 106. FIGS. 10 and 11 illustrate a conventional master key 110 and key blank 100. In another embodiment, master key 110 may be a sidewinder master key with a sidewinder pattern 112, and blank key 100 may be a sidewinder blank key.

Figure 2:
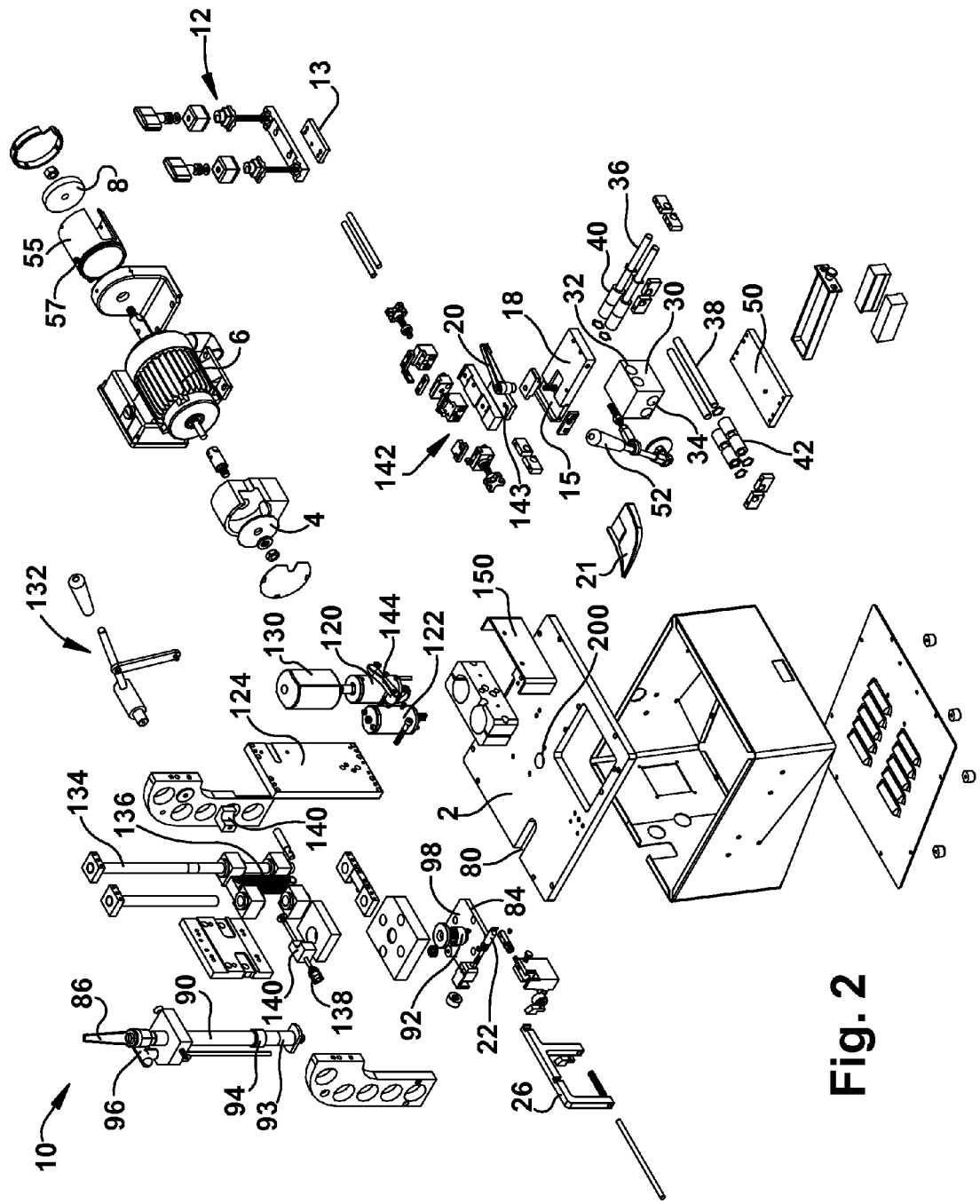
FIG. 2 is an exploded view of the key cutting machine of FIG. 1 preparing for interchanging to a sidewinder key cutting machine.
Figure 3:
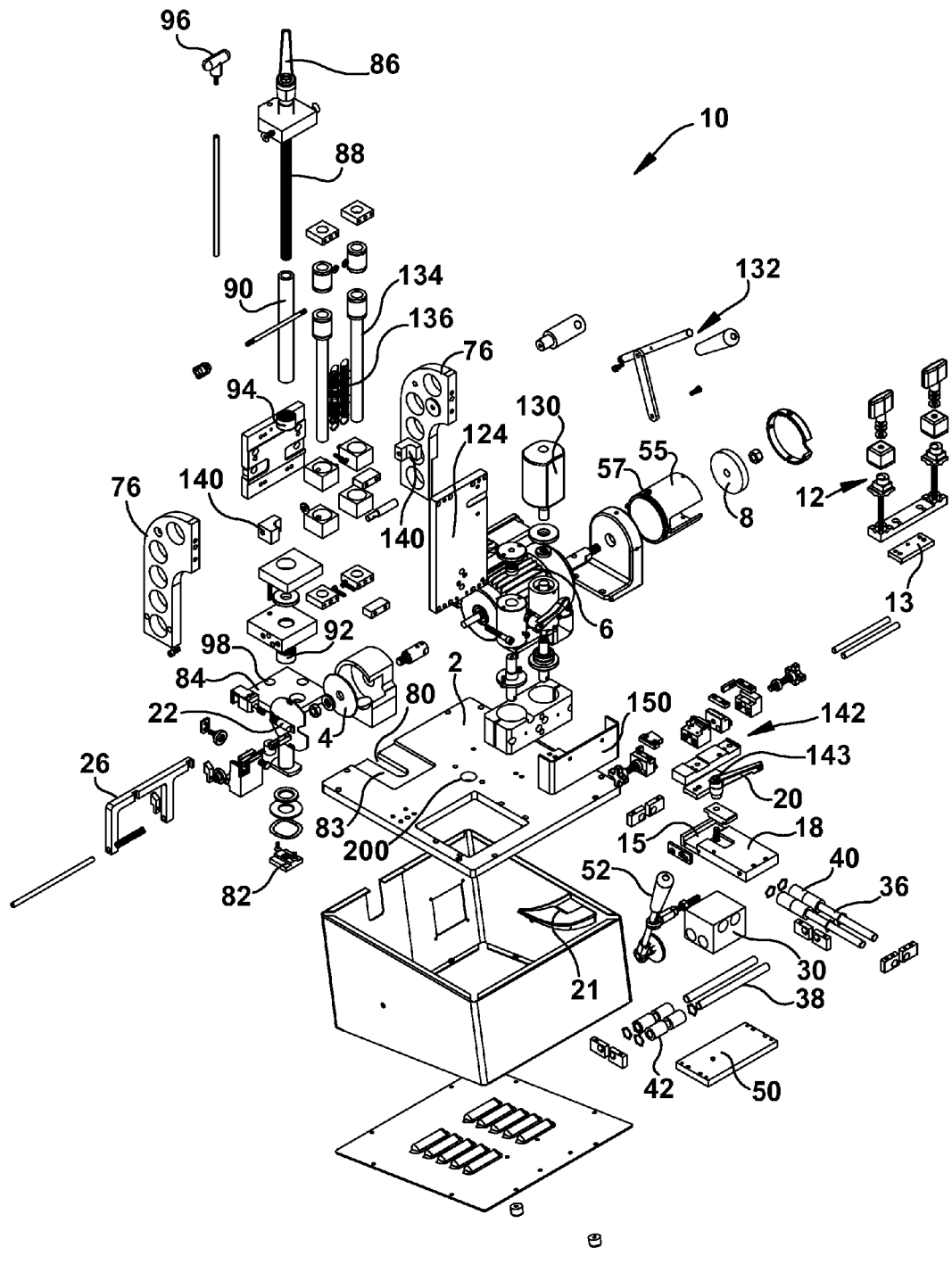
FIG. 3 is an exploded view of the key cutting machine of FIG. 1 preparing for interchanging to a sidewinder key cutting machine.
Figure 4:
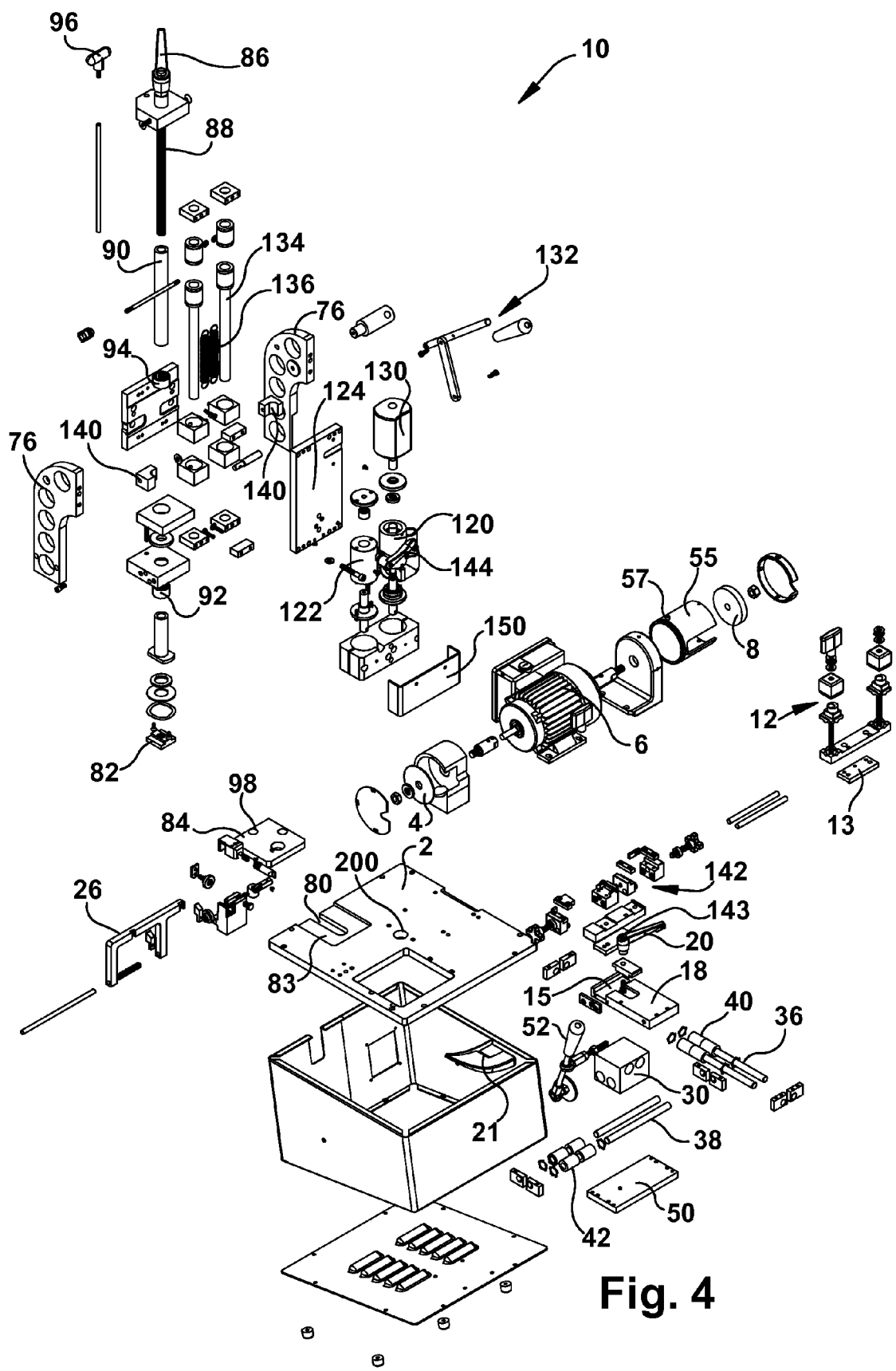
FIG. 4 is an exploded view of the key cutting machine of FIG. 1 preparing for interchanging to a sidewinder key cutting machine.

With reference to FIGS. 1 and 2, a brief description of the structure of the key cutting machine 10 of the present invention is as follows. Exploded views showing the parts and assembly of the key cutting machine 10 are shown in FIGS. 2-4. An assembled key cutting machine of the present invention is shown in FIG. 1. The key cutting machine 10 may have a base 2, a cutting member 4, a motor 6 and a wire brush 8. The key cutting machine has a pair of vise grips or clamps 12, having top jaws 14 and bottom jaws 16, mounted in a corresponding groove of the carriage 18. An actuating handle 20 selectively locks the clamp 12 in a fixed position. Therefore, the arrangement allows clamps 12 to be easily removed, replaced, and/or positioned.

A spare key holder 21 may be connected to the carriage 18. A master key 110 having a key pattern 112 previously cut therein is placed within the left-most clamp 12 on the carriage 18 and a key blank 100 for duplicating the keyway groove 108 of the master key 112 is placed in the adjacent clamp 12 on the carriage 18. A gauge fork 26 may be mounted on the base 2. The gauge fork 26 may be used to align the master key 110 and the key blank 100 in the correct and exact orientation within the clamps 12. The carriage 18 is moveable longitudinally with respect to the cutting wheel 4. The carriage 18 may be moveable toward and away from the cutting wheel 4. The motor 6 may be turned on manually, or a switch can automatically engage the motor when the carriage 18 is moved toward the cutting wheel 4. The key cutting machine 10 has a stylus or tracer 22 that faces the key pattern 112 of the mounted master key 110. The cutting wheel 4 faces the mounted key blank 100. To cut the pattern 112 from the master key 110 into the key blade 106 of the key blank 100, the master key 110 may be manually or automatically pressed against the tracer 22. The key blank 100 is likewise pressed against the cutting wheel 4 to the same depth as permitted by the tracer 22 against the master key 110. The carriage may be moved longitudinally, with respect to the cutting wheel, to cut the key pattern 112 from the master key 110 into the key blade 106 of the key blank 100.

A feature of the key cutting machine 10 of the present invention is the use of an improved carriage 18 versus the old tilt carriage of the prior art. The carriage 18 promotes key cutting accuracy as well as interchangeability of clamp types. As shown in FIG. 1, the carriage 18 can be driven by lever 52 so that the carriage 18 can move longitudinally as well as toward and away from cutting members. The carriage allows for a straight line, coplanar approach to the cutting wheel 4, as opposed to the conventional tilt/pivot approach. As shown in the exploded FIGS. 2-4, the carriage 18 is slidably mounted over a shaft guide 30 with four cylindrical apertures 32, 34. An upper shaft pair 36, lower shaft pair 38, and corresponding bearings (40 and 42, respectively) are positioned in the shaft guide apertures 32, 34 so that the shafts are axially moveable. The shaft pairs 36, 38 may be positioned perpendicularly with respect to each other. This allows the carriage 18 to move longitudinally and towards and away from the cutting wheel 4 in a substantially horizontal plane relative to the base 2.

Figure 5:
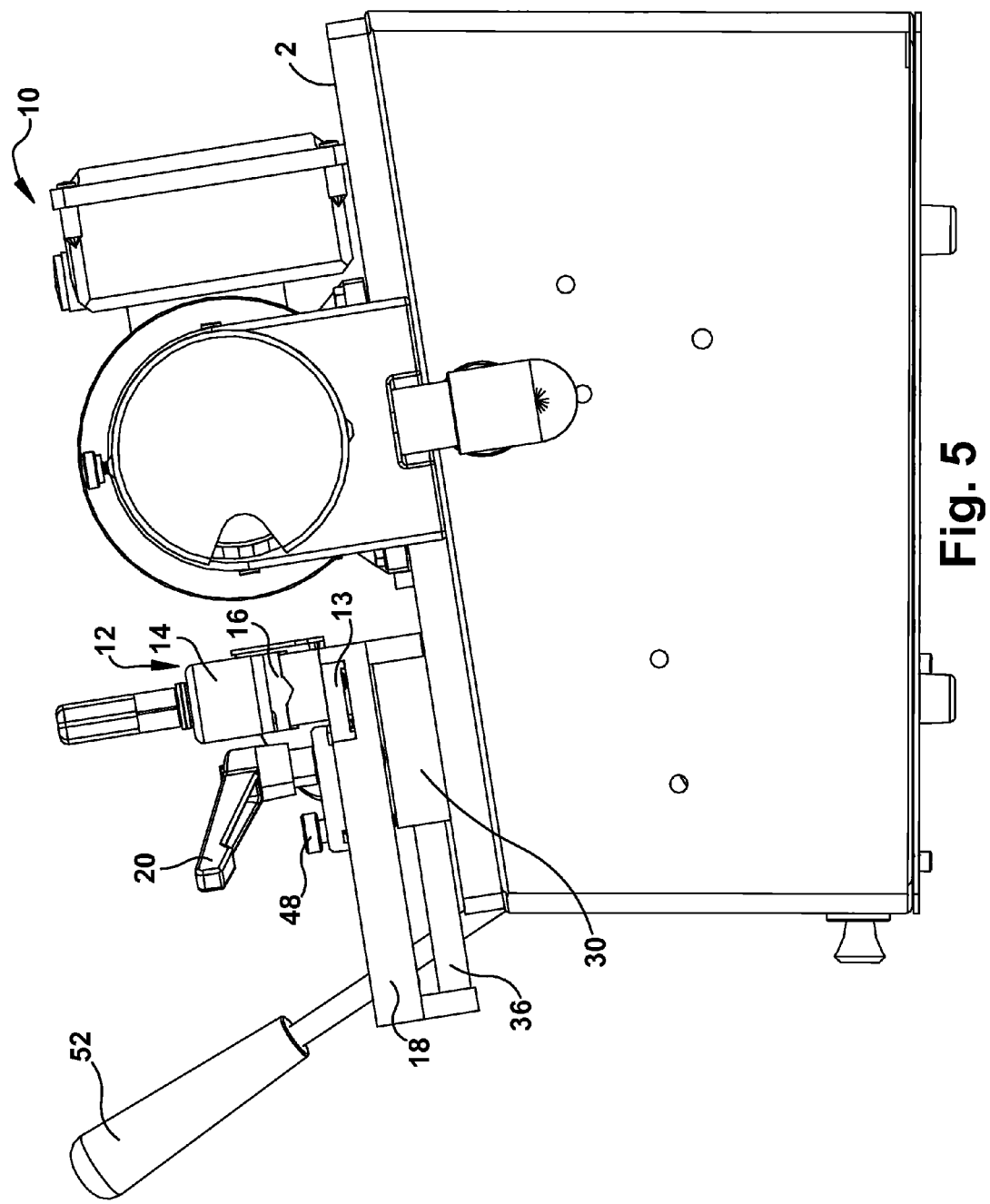
FIG. 5 is a side view of the key cutting machine of FIG. 1.

As shown in FIG. 5, upper shaft pair 36 allows carriage 18 to move toward and away from the cutting wheel 4. Each upper shaft 36 is mounted to opposing ends of the carriage 18. When mounted, the upper shaft pair 36 is positioned above the base 2. The carriage 18 can be secured with respect to movement toward and away from the cutting wheel 4 by rotating a set screw 48 to lock the carriage 18 against the upper surface of the shaft guide 30. Longitudinal movement of the carriage 18 is accomplished by the lower shaft pair 38. The lower shaft pair 38 is positioned in the shaft guide 30 below the base 2 surface. The lower shaft pair 38 is mounted to a plate 50, as well as the bottom of the base 2, best shown in FIG. 2. Movement of the carriage 18 is controlled by lever 52. Lever 52 is connected to the carriage 18 by a knuckle bearing 54. It is understood that the distance between the lever 52 and carriage 18 can be adjusted to increase or decrease travel.

The key cutting machine 10 may be operated in an automatic mode or manual mode. To operate the key cutting machine 10 manually, the master key 110 and the key blank 100 are placed in the appropriate jaws 12. The gauge fork 26 is used to verify the proper position and alignment of the master key 110 and key blank 100 and then rotated away from the clamp to an out of the way position, as shown in FIG. 1. The carriage 18 may then be positioned with the lever 52 so that tracer 22 engages the master key 110 adjacent the head 102. The carriage 18 is moved longitudinally to the left, and held against the tracer and cutting member by the user via the lever 52. The tracer 22 engages the pattern 112 in the master key 110 and the cutting wheel 4 cuts the identical pattern into the key blank 100. The user can move the carriage 18 at will longitudinally and the master key pattern 112 is cut into the key blank 100. When the cutting process is complete, the user can lower, or release the lever 52 so that the carriage 18 slides away from the cutting wheel 4 to a "carriage down" position at the lower end of the base, as shown in FIG. 3. It is understood that during the fall to the carriage down position, a switch (not shown) can automatically turn the motor 6 off. The key blank 100 is then removed from the clamps 12 and buffed in the wire brush 8.

In one embodiment, to ensure that the key blank 100 and the master key 110 are positioned properly within the key cutting machine 10, the key cutting machine 10 may include an additional feature wherein the clamps 12 are selectable for properly clamping and holding numerous types of keys therein. In particular, the upper and lower jaws 14, 16 may be rotatable to provide separate clamping areas therebetween to accommodate different types of master keys and key blanks for accommodating key width and particular groove structures. Therefore, depending upon the type of master key and key blank being used, the clamps 12 of the key cutting machine 10 may be rotated to accommodate particular key configurations. Such jaw positions can be color coded or identified to assist the operator in identifying the proper jaws to use with particular master key and key blank configurations. The improved carriage 18 also ensures proper positioning and allows for interchanging clamps for different cutting machines, so that only one carriage may be used. Illustrative examples of keys that can be held for duplication include conventional, tubular, dimpled, and sidewinder cut keys. This is particularly useful when a second cutting assembly is mounted on the base 2, as described below.

In yet another feature, the position of a guard 55 covering the brush can be adjusted by loosening screw 57, thereby allowing the user to buff a newly cut key at any desired position. Further, the key cutting machine can utilize a direct drive motor 6. Conventional key cutting machines utilize a pulley motor system. By utilizing a direct drive motor 6, the motor performance can be greatly improved and the size and power supply requirements can be reduced. Thus, power efficiency and improved performance can be achieved.

Another feature or improvement of the key cutting machine 10 of the present invention is that the cutting machine can utilize a cam drive to automatically drive the carriage 18 during conventional key cutting. Other key cutting machines utilize a spring biased carriage system. A deficiency of spring biased carriage system is that the spring biased carriage system may not securely position the clamp members and carriage through the final cutting portion of the key tip. Therefore, the cutting wheel may slide off of the end of the key blank and not complete the key pattern. Utilizing a cam drive enables the cutting wheel 4 to drive through the end of the key and prevents the carriage 18 from backing off the tip of the cut key.

Figure 6:
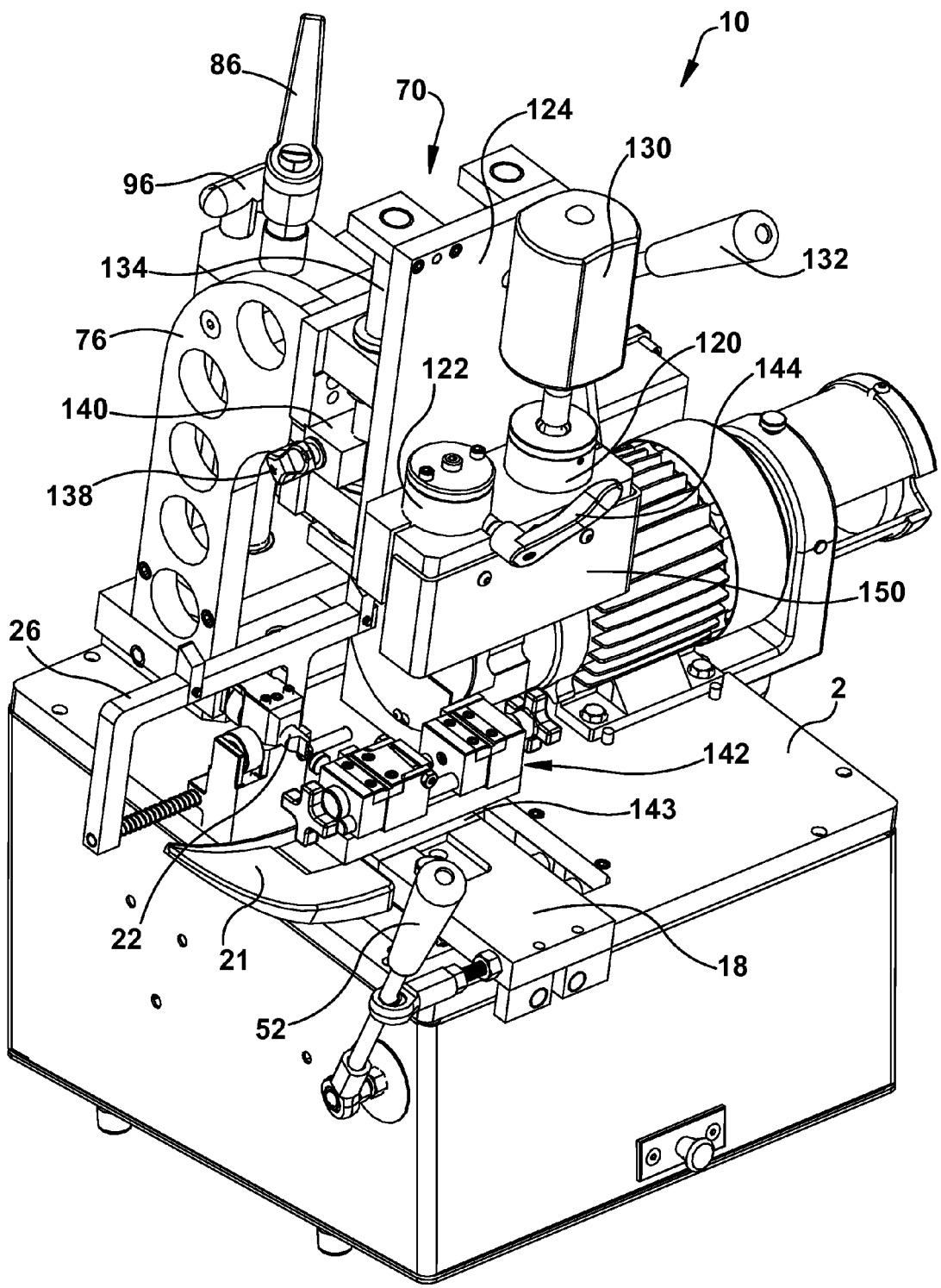
FIG. 6 is a perspective view of the key cutting machine of FIG. 1 with the sidewinder key cutting apparatus connected thereto.
Figure 7:
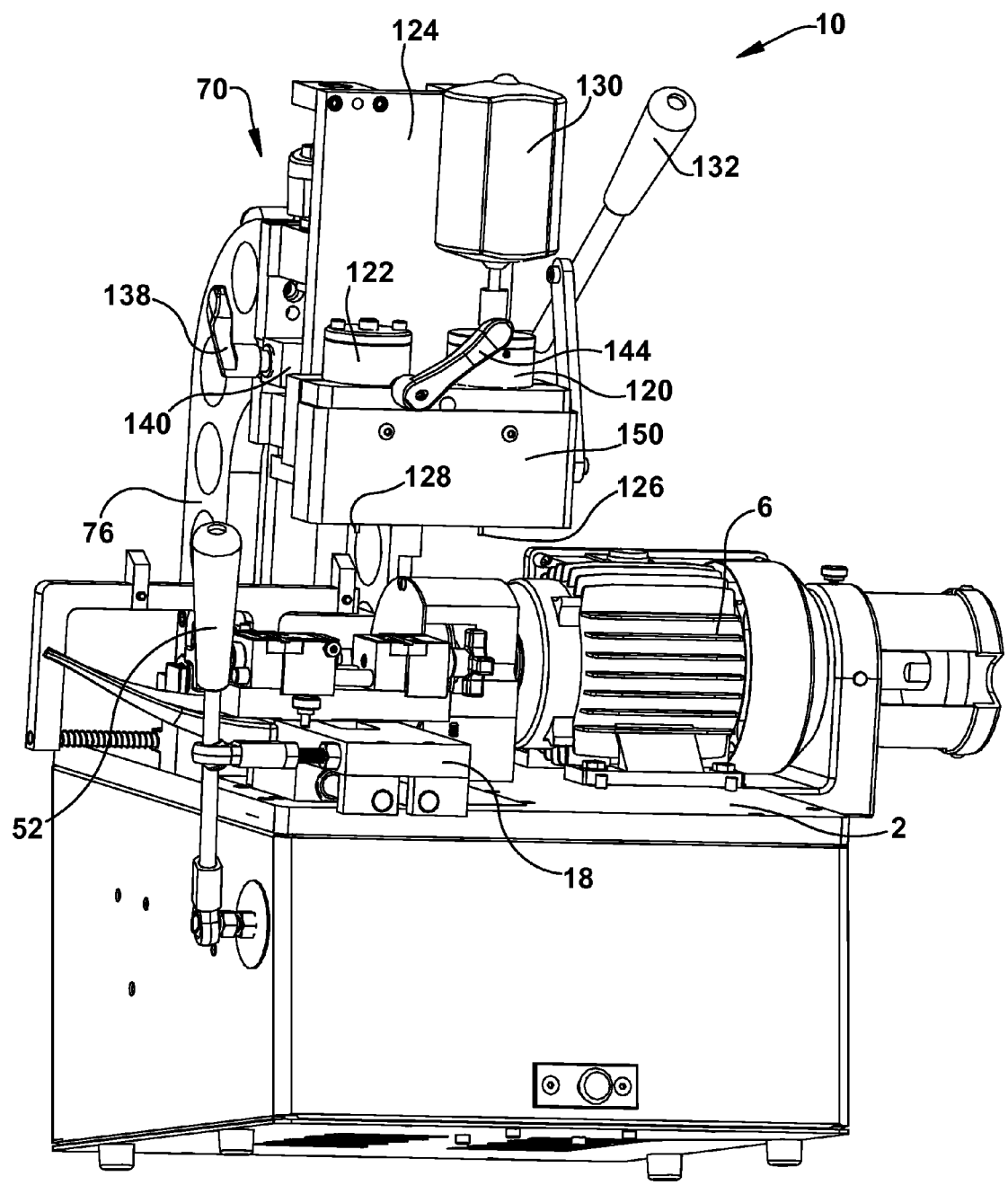
FIG. 7 is a front view of the key cutting machine of FIG. 1 with the sidewinder key cutting apparatus connected thereto.
Figure 8:
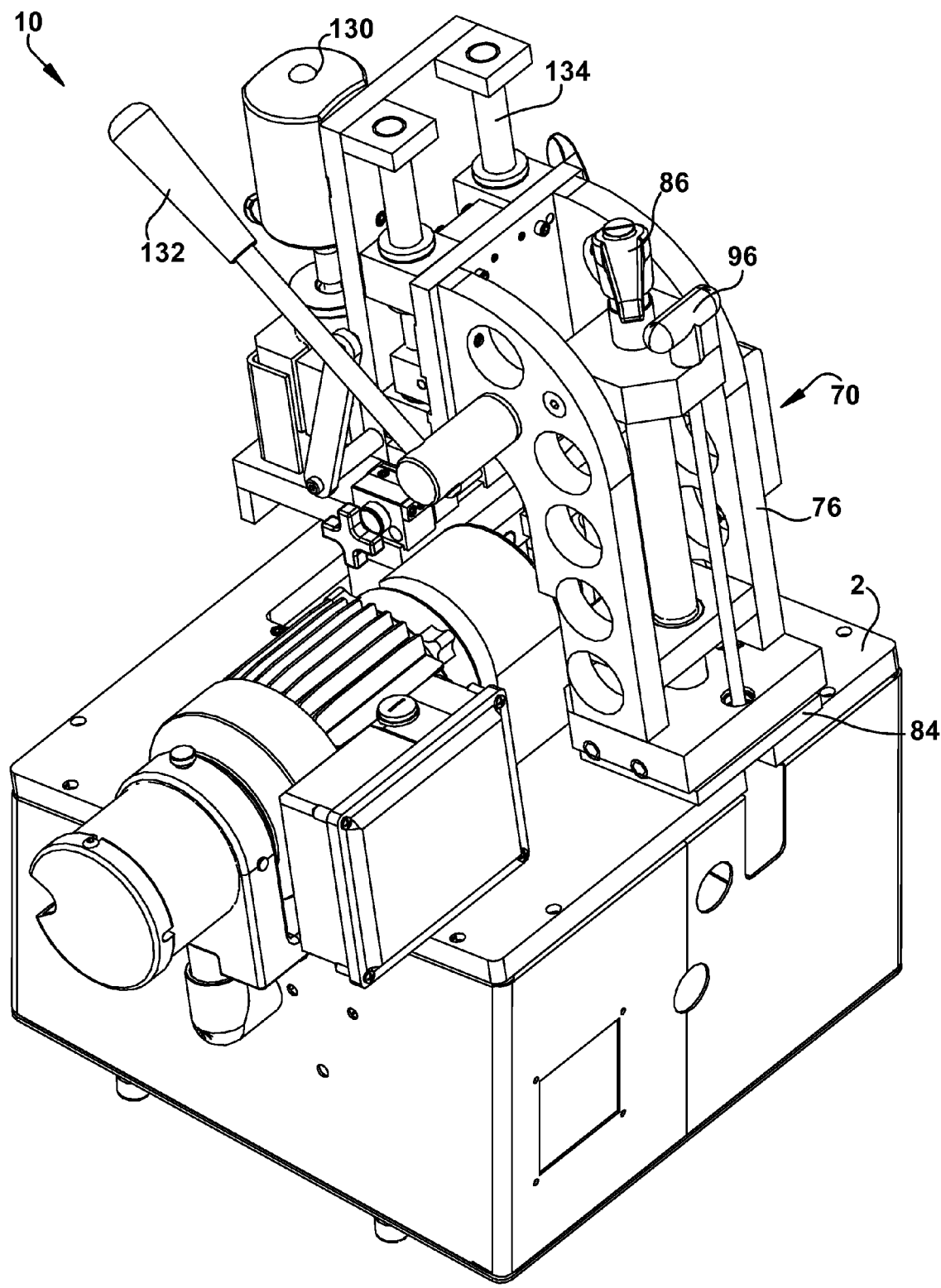
FIG. 8 is a rear view of the key cutting machine of FIG. 1 with the sidewinder key cutting apparatus connected thereto.

Another improvement of the present invention is a novel assembly wherein a second vertical cutting member can be mounted with a first horizontal cutting member to the same base 2 on the key cutting machine 10. In a preferred embodiment, the second cutting member is a sidewinder cutting assembly 70 with a sidewinder drill-bit type cutting member so that dimples, holes, or contour cutting can be provided. It is understood that the sidewinder cutter assembly 70 can be fixedly, or removeably, mounted to the base. As shown in FIGS. 6-8, a sidewinder cutter assembly 70 can be mounted to the base 2 and plugged into a power supply outlet (not shown). As shown in FIG. 7, the sidewinder cutting assembly 70 of the illustrated embodiment comprises a cutter 126 and tracer 128 substantially vertically disposed above the base 2, and a support/frame 76. The sidewinder cutter 126 is generally a drill-type cutting member so that dimples, holes, or contour cuts can be made.

As shown best in exploded FIGS. 2-4, the base 2 can have an opening, or keyway 80, for removably attaching the sidewinder cutting assembly 70. The sidewinder cutting assembly 70 can be mounted so that a key nut 82 is positioned within the keyway 80, the sides sliding under the base 2. Plate 84 is mounted on the top of the base 2. As shown in FIGS. 3 and 4, a recess 83 may be provided in base 2 to facilitate positioning of plate 84 on the base 2. When placed in the desired position the sidewinder cutting assembly is secured by rotating the locking nut lever 86 clockwise ¼ of a turn. The threaded rod 88 rotates and pulls key nut 82 toward the bottom of the base 2, thereby securing the sidewinder cutting assembly 70 to the base 2.

In another embodiment, the sidewinder cutting assembly 70 may be pivotally mounted between a key cutting position and a storage position. The ability to pivotally move the sidewinder cutting assembly 70 allows unimpeded use of the cutting wheel 4 without having to remove the sidewinder cutting assembly 70. As best shown in exploded FIGS. 2-4, column 90 includes a bearing 92 (at 93) and bushing 94. To rotate the assembly, the lock nut lever 86 is loosened, for example, rotating or turning the lock nut lever 86. The lock positioner 96 may then be lifted out of the aperture 98 of the plate 84. The sidewinder cutting assembly 70 may be pivoted to a desired position wherein the lock positioner 96 will slide into position in the desired aperture 98 of the plate 84. The lock nut lever 86 is rotatable to a tightened position. It is understood that the plate 84 can have any number of holes to position the sidewinder assembly 70 at any desired position. It is also understood that even if the sidewinder assembly 70 is permanently attached to the cutter, it may still have the pivotable capability.

As shown in FIGS. 6 and 7, a cutter housing 120 and a tracer housing 122 are mounted on a plate 124. The cutter housing 120 and tracer housing 122 hold the sidewinder cutter 126 and tracer 128, respectively. The cutter 126 and tracer 128 are removably secured in place by a set screw, thereby allowing use of different cutters and tracers. It is understood that the cutter 126 and corresponding tracer 128 may be removably secured in any manner as will be appreciated by one of ordinary skill in the art. An electric motor 130 is mounted to plate 124 and connected to the cutter 126 and drives the cutter 126 in a direct drive manner. When not in use, the cutter 126 and tracer 128 are held in an unactuated position by springs 136, shown in FIGS. 2-4. Lever 132 is selectively manually rotatable for vertically lowering along guides 134 the cutter 126 and tracer 128 to engage the blank key and master key, respectively, in a manner that may be similar to a conventional drill press. The cutter 126 and tracer 128 can be positioned at any location on the guides 134 by rotating lock handle 138 to cause block members 140 to securely engage the guides 134.

In one illustrative embodiment, to use the sidewinder cutting assembly 70, the clamp 12 may be removed from the carriage 18, and replaced with a sidewinder clamp 142 capable of holding the master key 110 and the key blank 100. The sidewinder clamp 142 is best shown in FIG. 6. The sidewinder clamp 142 is positioned in a corresponding groove 15 of the carriage 18. As shown in FIGS. 2-4, the interchangeable conventional clamps 12 and the sidewinder clamps 142 may have protrusions 13 and 143, respectively, for positioning in the groove 15. An actuating handle 20 selectively locks the sidewinder clamp 142 in a fixed position on the carriage 18. (Actuating handle not shown in FIG. 6). The arrangement of the clamp 142 and carriage 18 allows the clamp 142 to be easily removed, replaced, and/or positioned. The carriage 18 may then be selectively manually positioned so that the cutter 126 and the tracer 128 are vertically aligned with the key blank 100 and master key 110, respectively. Next, the tracer depth is set. To set the depth, the lock handle 144 may be loosened. Next, the cutter positioning arm 132 may be rotated to lower the tracer 128 to the master key 110 to set the tracer 128 to the cutter depth. When set, the tracer lock handle 144 may be tightened to secure the tracer 128 at the desired depth. Next, the cutter positioning arm 132 is released allowing the cutter 126 and the tracer 128 to return to its unactuated position. The cutter positioning arm 132 lowers the tracer 128 and cutter 126, triggering a second switch (not shown) and energizing the cutter 126. The lock handle 138 is tightened to secure the cutter 126 and tracer 128 in position. The carriage 18 is then engaged with the tracer 128 which follows the contour of the master key 110. This can be repeated for the other side of the key blank 100, if necessary.

A guard 150 is provided for operator safety. As shown in FIG. 6, the guard 150 can surround the cutter 126 and the tracer 128. As will be appreciated and understood by those skilled in the art, the guard 150 can optionally be connected to a vacuum device (not shown). Additional housing may be used to prevent accidental contact with any moving parts, as best shown in FIG. 9. A vacuum system can be mounted on or near the key cutting machine 10 and plugged into a power supply outlet, on or near the key cutting machine (as described in U.S. patent application Ser. No. 10/970,844, filed on Jun. 23, 2005, and related provisional application No. 60/512,636, filed on Oct. 20, 2004, herein incorporated by reference herein). A vacuum port may be located within the housing so as to provide vacuum communication between the interior of the housing and the vacuum system. In one embodiment, a vacuum line may run from the port to the base 2 at aperture 200. The port may be located directly under the cutting wheel 4. The vacuum tube may be removably connected to the vacuum port so that when the vacuum tube is connected to the vacuum port, the vacuum is capable of collecting key shavings from within the housing created during a key cutting operation. When the vacuum tube is disconnected from the vacuum port, the vacuum tube can be used as a hand-held vacuum wand to vacuum metal shavings from the key cutting area and surrounding area for general clean-up. Preferably, the vacuum is actuated when the cutting wheel is actuated.

The invention has been described above and, obviously, modifications and alternations will occur to others upon a reading and understanding of this specification. The claims as follows are intended to include all modifications and alterations insofar as they come within the scope of the claims or the equivalent thereof.

What is claimed is:

1. A key cutting machine comprising:
    a base member including a generally horizontal surface;
    a first cutting member positioned on said base member, said first cutting member having a cutting wheel capable of cutting a standard key pattern onto a key blank;
    a second cutting member positioned on said base member, said second cutting member including a sidewinder drill-type cutting member capable of cutting dimples and contours onto a key blank;
    a carriage connected to said base;
    a first key clamp connected to said carriage and moveable therewith; and
    a driver connected to said carriage to automatically drive movement of the carriage during key cutting operations.

2. The key cutting machine of claim 1 wherein said first cutting member is rotatable about an axis substantially parallel to said base member.

3. The key cutting machine of claim 2 wherein said second cutting member is rotatable about an axis substantially perpendicular to said base member.

4. The key cutting machine of claim 1 wherein said first and second cutting members are fixedly mounted to said base member.

5. The key cutting machine of claim 1 wherein said second cutting member is a drill-type cutting member.

6. The key cutting machine of claim 1 further comprising a first tracing member connected to said base member and capable of tracing a key pattern from said master key.

7. The key cutting machine of claim 6 further comprising a second tracing member connected to said base member and capable of tracing a sidewinder key pattern from said master key.

8. The key cutting machine of claim 1 wherein said carriage is moveable along two axes.

9. The key cutting machine of claim 8 wherein said two axes are substantially perpendicular.

10. The key cutting machine of claim 9 wherein said two perpendicular axes are substantially parallel to said base member.

11. The key cutting machine of claim 1, wherein the driver comprises a motor.

12. The key cutting machine of claim 1 further comprising a second key clamp connected to said carriage.

13. The key cutting machine of claim 1 wherein said second cutting member is rotatable between a cutting position and a storage position.

14. The key cutting machine of claim 1 wherein said second cutting member is removably mounted to the base member.

15. A key cutting machine comprising:
    a base member;
    a first cutting member positioned on said base member, said first cutting member having a cutting wheel capable of cutting a standard key pattern onto a key blank;
    a second cutting member positioned on said base member, said second cutting member capable of cutting both an internal cut and an external cut sidewinder key pattern onto a key blank, said second cutting member is removably mounted to the base member;
    a carriage connected to said base member wherein the carriage is automatically movable within a plane relative to said base member;
    a first key clamp connected to said carriage and moveable therewith; and
    a driver connected to said carriage to automatically drive movement of the carriage during key cutting operations.

16. The key cutting machine of claim 15 wherein said second cutting member is rotatable between a cutting position and a storage position.

17. The key cutting machine of claim 15 further comprising a wire brush.

18. A key cutting machine comprising:
    a base member;
    a first cutting member positioned on a first cutting assembly, said first cutting assembly attached to said base member, said first cutting member is configured to cut a standard key pattern on a first key blank;
    a second cutting member positioned on a second cutting assembly, said second cutting assembly mounted on said base member, said second cutting member capable of cutting dimple pattern and sidewinder key patterns onto a second key blank;
    a carriage connected to said base member wherein the carriage is movable within a plane relative to said base member;
    a first key clamp connected to said carriage; and
    a driver connected to said carriage to automatically drive movement of the carriage during key cutting operations.

19. The key cutting machine of claim 18 wherein the base member includes an opening or keyway for removably attaching the second cutting assembly.

20. The key cutting machine of claim 18 wherein said second cutting assembly is rotatable between a cutting position and a storage position.

* * * * *